May 25, 1954 R. L. JAESCHKE 2,679,604
EDDY CURRENT MECHANISM
Filed Aug. 18, 1951 3 Sheets-Sheet 1
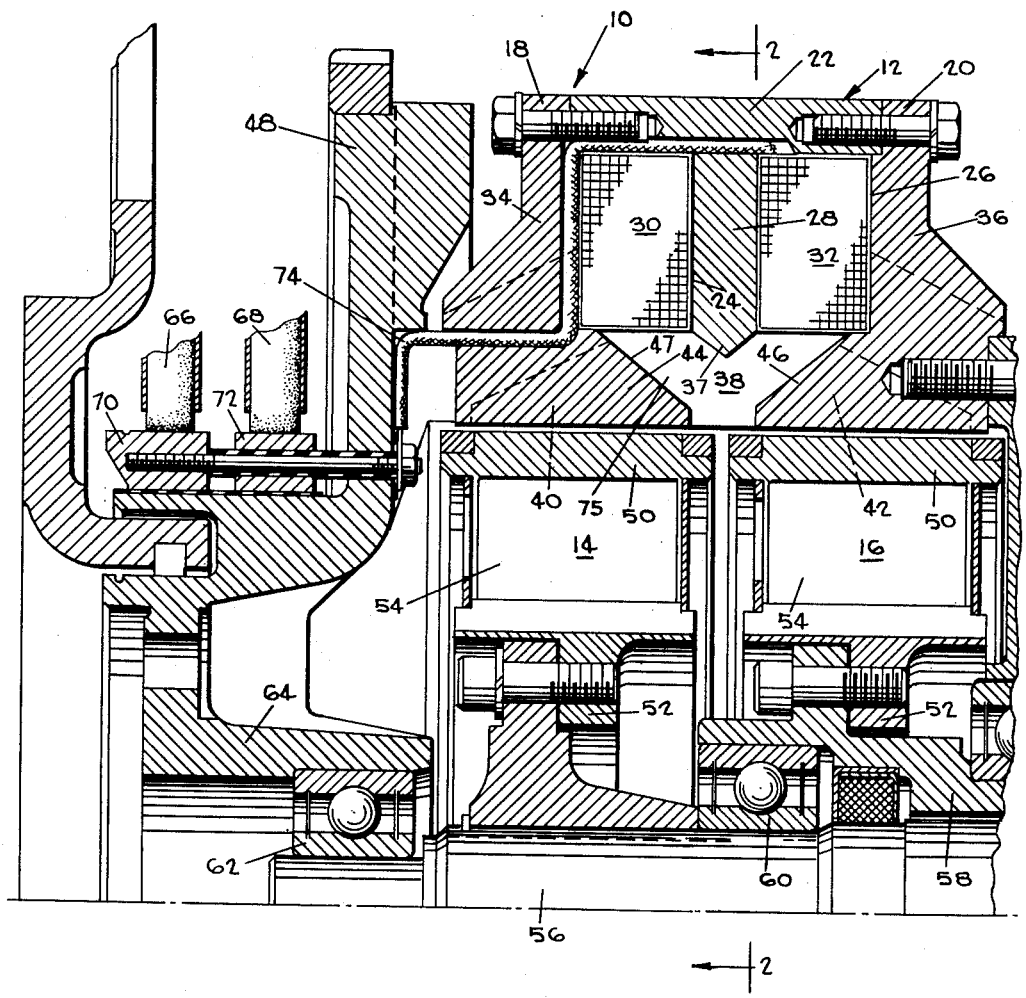
FIG_1
INVENTOR.
RALPH L. JAESCHKE
BY
ATTORNEYS May 25, 1954  R. L. JAESCHKE  2,679,604
EDDY CURRENT MECHANISM
Filed Aug. 18, 1951  3 Sheets-Sheet 2
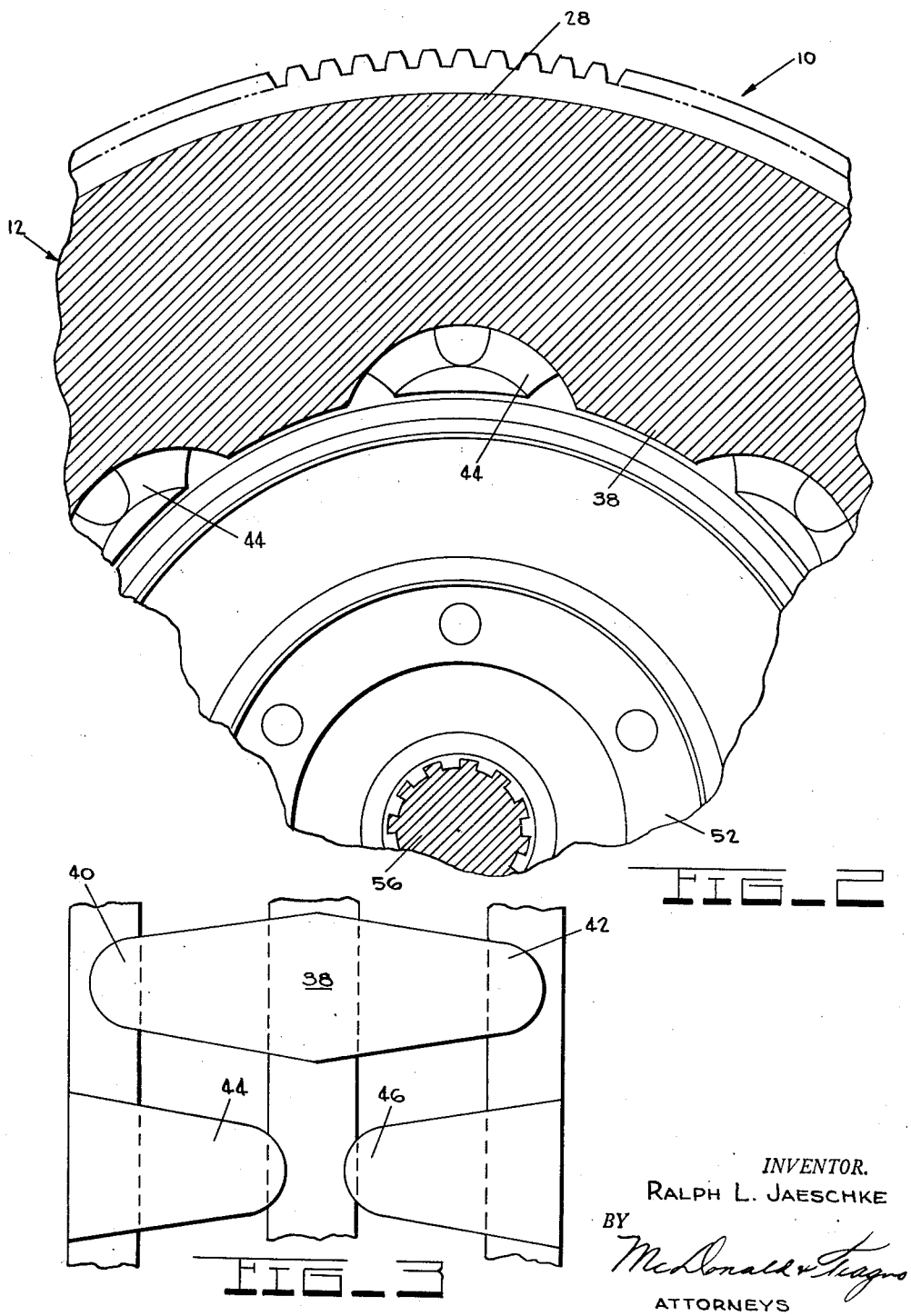
INVENTOR.
RALPH L. JAESCHKE
BY
McDonald & Shapiro
ATTORNEYS May 25, 1954 R. L. JAESCHKE 2,679,604
EDDY CURRENT MECHANISM
Filed Aug. 18, 1951 3 Sheets-Sheet 3
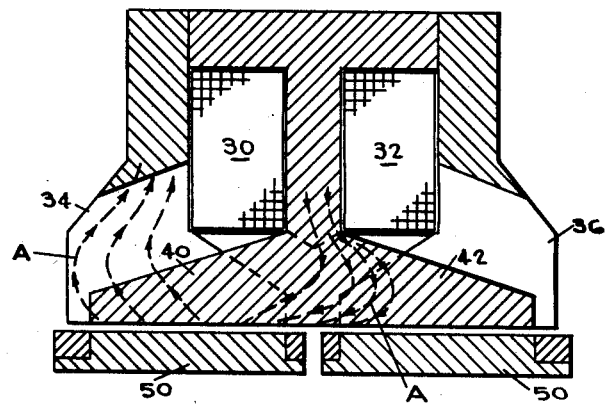
FIG_4
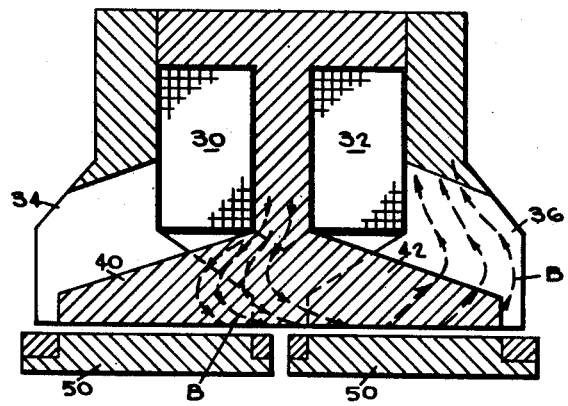
FIG_5
INVENTOR
RALPH L. JAESCHKE
BY
ATTORNEYS Patented May 25, 1954

2,679,604

UNITED STATES PATENT OFFICE 2,679,604

EDDY CURRENT MECHANISM

Ralph L. Jaeschke, Kenosha, Wis., assignor, by mesne assignments, to Eaton Manufacturing Company, Cleveland, Ohio, a corporation of Ohio Application August 18, 1951, Serial No. 242,501

20 Claims. (Cl. 310—101)

This invention relates to eddy current electromagnetic mechanism and more particularly to a dual clutch mechanism.

Broadly the invention comprehends a dual eddy current clutch mechanism comprising a member having a pair of independent field coils mounted thereon utilizing a common center magnetic flux path disposed between the coils, in the separate energization of the field coils and a pair of independent members, one associated with the magnetic circuit of one field coil and the other associated with the magnetic circuit of the other field coil whereby the member having the field coils therein constitutes a common clutch member for clutch cooperation with the other pair of independent members, independent of each other.

Although a great number of dual clutch mechanisms of an eddy current electromagnetic nature have been devised none have utilized to advantage for the provision of a compact and practical structure, a common center for the passage therethrough of magnetic flux for the independent operation of each clutch.

Among the principal objects of the invention is the provision of a dual eddy current clutch mechanism;

1. That is simple and compact of construction and economical to manufacture;
2. That is of a minimum in weight resulting in lower inertia and improved acceleration time;
3. That has a compact mechanical system providing reliable operation;
4. That has a compact electrical system providing ease in the connecting of the field coils thereof;
5. That has a magnetic system wherein the flux leakage is minimized thereby providing increased torque output;
6. That utilizes a common center flux flow path for separate field coils of the mechanism; and
7. That utilizes the material in the teeth portion of the one clutch which is de-energized as a flux flow path for flux passing through the common center of the mechanism when the other clutch is energized.

Other objects and advantages of the invention will appear from the following description taken in connection with the drawings forming a part of the specification; and in which:

Fig. 1 is a fragmentary partly cross-sectionalized view of an eddy current mechanism embodying the invention;

Fig. 2 is a cross-sectional view taken substantially along lines 2—2 of Fig. 1;

Fig. 3 is a fragmentary elevation view of the tooth form of the input member of the mechanism of Fig. 1;

Fig. 4 is a fragmentary partly cross-sectionalized view of input and output members of the structure of Fig. 1 illustrating the flux flow path upon energization of one of the coils of the input member; and Fig. 5 is a view similar to Fig. 4 wherein the other coil of the input member is energized and the first coil de-energized.

Similar reference characters indicate corresponding parts throughout the several views of the drawings.

This eddy current electromagnetic clutch mechanism was devised for the principal purpose of providing such a mechanism of generally improved structure over the previous mechanisms of this type. The major factor in so accomplishing this purpose was in the practical utilization of a center section of an input member, upon which a pair of field coils for the mechanism are disposed, as a common magnetic flux flow path for both coils, that is the magnetic circuits for each coil include said center section since the coils are not to be energized simultaneously. The field coils in conjunction with the input member are adapted to cooperate by way of their separate magnetic circuits with separate output members for the controlled operation thereof. By so being able to utilize one segment of the input member as a common flux flow path for two separate field coils together with a tooth arrangement therein opposite disposed teeth are provided integral with one another and the common flux flow path segment, a material saving in weight and space is achieved. As a direct result of the decrease in weight a decided saving in cost is had because of material saved and simple fabrication of the coils in the input member as well as a distinct acceleration advantage due to the lowering of the inertia of the input member. The common center section for the field coils provides a compact structure both from a mechanical and electrical standpoint, mechanically in the reduction of parts and the provision of a sturdier structure of reliable operation and electrically in the ease for connection of the coils. With the magnetic flux path for the coils restricted in part to a common path a short and effective magnetic circuit is provided thereby decreasing the overall leakage thereof.

Referring to the drawings for more specific details of the invention 10 represents generally an eddy current electromagnetic clutch mechanism comprising basically a motor or input member 12 and two inductor drums or output members 14 and 16 respectively.

The input member 12 comprises a pair of annular elements 18 and 20 with an annular element 22 disposed intermediate said elements 18 and 20 and suitably secured relative thereto providing spaced annular openings 24 and 26 one disposed on each side of a center section 28 of element 22.

Annular electromagnet field coils 30 and 32 are mounted in secured relation in the respective openings 24 and 26, with coil 30 arranged between an annular portion 34 of element 18 and center section 28 of element 22 and with coil 32 arranged between an annular portion 36 of element 20 and center section 28 of element 22.

As noted in viewing Fig. 1 the center section 28 of element 22 extends radially inward to a zone approximating the inner diameter of coils 30 and 32 and preferably terminates in tapered portions 37, the purpose of which will hereinafter appear.

The inner peripheral portion of the element 22 is formed to provide a plurality of opposite axially extended equicircumferentially spaced polar teeth 38, with opposite axial portions 40 and 42 thereof received in interdigitated relation to equi-circumferentially spaced opposite polarity polar teeth 44 and 46 formed respectively on the inner peripheral portions of the elements 18 and 20. The teeth 44 and 46 as noted from Figs. 1 and 3 are axially spaced apart from one another by a predetermined amount and also are provided with tapered surfaces 47 lying parallel to the tapered extremity of section 28 of element 22, the purpose of which will hereinafter appear. The tapered portions 37 are circumferentially disposed between the circumferentially spaced teeth 38.

The input member 12 is adapted to be connected to a prime mover source of power, not shown, by way of a support plate 48 secured to element 18.

Each of the output members 14 and 16 includes an outer peripheral ring 50, a hub 52 and a plurality of substantially radially extended ribs or spokes 54 arranged in secured relation intermediate the ring and hub effective to afford a sturdy yet somewhat resilient body therebetween. Whereas hub 52 of member 14 is suitably secured to an output shaft 56, hub 52 of member 16 is suitably secured to an output quill shaft 58.

The external peripheral surfaces of the rings 50 of the respective members 14 and 16 are radially spaced a predetermined amount from the internal peripheral surfaces of the respective interdigitated portions 40 of polar teeth 38 and polar teeth 44 and portions 42 of polar teeth 38 and polar teeth 46.

Quill shaft 58 is journalled for rotation upon a bearing 60 mounted on shaft 56 and shaft 56 is in turn journalled in a bearing 62 mounted internally of the hub 64 of support plate 48.

Current is supplied to the field coils 30 and 32 from a source, not shown, by way of brushes 66 and 68 having electrical contact with collector rings 70 and 72 insulatingly mounted upon an external peripheral surface of the hub 64 of the support plate, said collector rings 70 and 72 being appropriately connected by conductors to the respective coils 30 and 32, conductor 74 connecting collector ring 70 as shown by Fig. 1 to coil 32 being representative of the current conducting connection between the rings and coils.

With the extremity of section 28 of element 22 being tapered as shown at portions 37 and teeth 44 and 46 each having tapered surfaces 47 lying substantially parallel to the sides of tapered portions 37 of section 28 a uniform separation 75 is had therebetween and flux leakage is thus minimized. The spacing 75 required to minimize leakage between the respective teeth 44 and 46, and the portion of center section 28 terminating in tapered portions 37 necessarily causes a decrease in the flux path but since center section 28 merges into polar teeth 38 intermediate the tapered portions 37 portion of section 28 an additional flux path is provided by way of the teeth 38.

The center section 28 of element 22 is of such axial thickness and radial width intermediate the teeth 38 of element 28 as to provide a suitable and ample capacity path for the flow of magnetic flux as a result of the energization of either coil 30 or 32, said section being common to the magnetic circuits of the coils permitting of the alternate engagement of either member 14 or 16 depending on which coil is energized. By extending the center section 28 to the inner diameter of the coils the flux lines which are confined therein between the coils can upon energizing therefrom flow freely in a looped path into the polar teeth 38 by way of the extension of the center section 28 into the teeth 38 intermediate the tapered portions 37 of section 28. Arrows A in Fig. 4 illustrate the flux flow path into a portion of portions 42 of the teeth 38 in the course of their passage from section 28 to the portion 40 of teeth 38 and the return flux flow path into portion 34 of annular element 18 upon the energization of coil 30 for clutching operation between input member 12 and output member 14. Arrows B in Fig. 5 illustrate similarly to Fig. 4 a flux flow path with regards to the energization of coil 32 for a clutching operation of input member 12 and output member 16. It is to be noted that the portions 34 and 36 of the respective sections 18 and 20 are enlarged near the circumferential zone of the poles such that the return flux flow follows a looped path therein similarly to the looped path in the teeth 38.

Inasmuch as the members 14 and 16 are adapted to constitute members of a drive wherein only one or the other is actuated at one time the center section 28 operates effectively in a common capacity to both coils 30 and 32. In so utilizing a section as 28 between the coils, a material weight and cost saving is accomplished over conventional systems. As a direct result of the weight saving of the field coil structure preferably high speed acceleration and deceleration will prevail.

In situations where the clutch members 14 and 16 are connected through a gear system for the opposite direction of rotation thereof for the say forward and reverse movement of a vehicle in which employed, the alternate energization of either the forward coil or the reverse coil will permit of a rapid reversal of vehicle movement or change from one gear ratio to another.

In a normal operation of the clutch mechanism with the input member 12 driven from a prime mover source of power by way of support plate 48, a rotation of the elements 18, 20 and 22 and coils 30 and 32 will result whereupon through the energization of coil 30 a magnetic flux circuit will be established passing around the coil 30 by way of section 28 of element 22, portion 42 of polar teeth 38 and between the portion 40 of polar teeth 38 and polar teeth 44 of elements 22 and 18 respectively and ring 50 of output member 14 providing for the cooperative rotation of output member 14 relative to input member 12. Upon the de-energization of coil 30 and energization of coil 32 a magnetic flux circuit is established similar to that established upon the energization of coil 30 utilizing section 28 as a flux flow path between the coils whereby the output member 16 is rotated cooperatively relative to the input member 12 as a result of the eddy currents generated therebetween by way of polar teeth 38 and 46 and ring 50 of output member 16.

Although the clutch mechanism 10 is here disclosed basically in regards to the transmission of power from a singular input member to two output members by means of independently energizable coils permitting of the independent operation of the output members, it is susceptible of numerous modifications and applications by those skilled in the art without materially departing from the scope of the invention. Accordingly the invention is to be limited as evidenced by the appended claims.

What I claim is:

1. An eddy current clutch mechanism comprising a member, two independently energizable field coils on the member having a common magnetic flux flow path intermediate the coils, two members independently and cooperatively relatively rotatable to the first member and means for energizing the coils independently of one another to provide for the generation of one magnetic circuit between the first member and one of the two members and a second magnetic circuit between the first member and the other of the two members, with one of said two members being coupled in the magnetic circuit of one coil and the other of said two members being coupled in the magnetic circuit of the other coil.

2. A clutch mechanism according to claim 1 wherein the first member is an input member and the two members are output members.

3. A clutch mechanism according to claim 1 wherein the first member is a rotor and the two members are inductor drums.

4. A clutch mechanism according to claim 1 wherein the first member is annular in shape, the coils are annular in shape and the first member includes an annular section arranged intermediate the coils, said section being of a width between the coils, effective to solely carry the magnetic flux flow of only one coil at any one time and having a portion terminating radially substantially at one radial extremity of the coils.

5. A clutch mechanism according to claim 4 wherein the coils are axially spaced apart from one another by the annular section of the first member.

6. A clutch mechanism according to claim 5 wherein the coils are of like size and shape.

7. A clutch mechanism according to claim 4 wherein the first member includes two sets of spaced polar teeth, one set associated with the magnetic circuit of one coil and the other set associated with the magnetic circuit of the other coil, and the two members each including a ring, with the ring of one of said two members arranged in adjacent spaced relation to one set of polar teeth and the ring of the other of said two members arranged in adjacent spaced relation to the other set of polar teeth.

8. A clutch mechanism according to claim 7 wherein the polar teeth are disposed on the inner circumferential surface of the first member and the annular section axially intermediate the coil terminate circumferentially intermediate the polar teeth on the first member radially inwardly substantially at the inner circumferential surface of the coils.

9. A clutch mechanism according to claim 8 wherein both sets of polar teeth lie in the same circumferential surface and wherein the rings lie in the same circumferential surface.

10. A clutch mechanism according to claim 8 wherein the first member includes a pair of similar annular elements, another annular element assembled intermediate the pair of annular elements and providing cooperatively with the pair of annular elements a pair of annular openings on opposite sides of the annular section thereof, for receipt of the coils therein.

11. A clutch mechanism according to claim 10 wherein the rings of the respective members are axially spaced relative to one another and disposed in spaced radially inward relation to the sets of polar teeth of the first member.

12. A clutch mechanism according to claim 11 wherein the pair of annular elements are each provided on their inner periphery with equi-circumferentially spaced teeth extending axially toward one another and wherein the intermediate annular element is provided on its inner periphery with two sets of integral equi-circumferentially spaced opposite axially extended teeth, with one set of teeth arranged in interdigitated relation to the teeth of the one annular element of the pair and the other set of teeth arranged in interdigitated relation to the teeth of the other annular element of the pair.

13. A clutch mechanism according to claim 12 wherein the intermediate annular element terminates at its inner radial circumferential surface circumferentially intermediate the polar teeth on the first member in a taper and wherein the polar teeth on the pair of annular elements are provided with tapered surfaces lying parallel to a complementary portion of the taper on the intermediate annular element in spaced relation thereto.

14. A clutch mechanism according to claim 13 wherein the coils are energized independently of one another.

15. A clutch mechanism according to claim 14 wherein the first member is an input member and the two members are output members.

16. An eddy current clutch mechanism comprising a member, a pair of annular field coils arranged in spaced relation on the member, two members independently and cooperatively relatively rotatable to the first member, means for energizing one of the field coils providing for the generation of a magnetic circuit around said coil and between the first member and one of said two members, and means for energizing the second field coil for the generation of a magnetic circuit around said coil and between the first member and the other of said two members, said coils having a common magnetic flux flow path intermediate the coils.

17. A mechanism according to claim 16 wherein the first member includes a pair of axially spaced annular magnetic polar faces radially spaced respectively to the two members.

18. An eddy current clutch mechanism comprising a member, a pair of field coils arranged on the member in spaced relation to one another separated by a portion of the member, said member having a pair of spaced annular polar faces, two members cooperatively relatively rotatable to the first member and relatively rotatable independently of one another, each of said two members having a portion arranged in adjacent spaced relation respectively to one of the pair of polar faces, means for energizing the coils for the independent generation of a magnetic circuit between one polar face and one of the two members and a second magnetic circuit between the second polar face and the second of the two members, said portion of the first member serving as a common magnetic flux flow path for both magnetic circuits.

19. An eddy current clutch mechanism comprising a member, two energizable field coils on the member, said member having a portion intermediate the coils providing a singular flux flow path for the coils, means for energizing the coils and two members independently and cooperatively relatively rotatable to the first member, with one of said two members being coupled in the magnetic circuit of one coil and the other of said two members being coupled in the magnetic circuit of the other coil, only one of said coils being energizable at one time providing for the coupling of one of the rotatable members with the coil in whose magnetic circuit it is magnetically coupled.

20. A clutch according to claim 19 wherein the portion of the member intermediate the coils is of a width capable of only carrying the magnetic flux of one coil at a time.

References Cited in the file of this patent

UNITED STATES PATENTS

| Number | Name | Date |
|---|---|---|
| 1,980,656 | Barnett | Nov. 13, 1934 |

FOREIGN PATENTS

| Number | Country | Date |
|---|---|---|
| 8,334 | Great Britain | of 1915 |
| 418,443 | Great Britain | Oct. 22, 1934 |